(12) United States Patent
Naumann

(10) Patent No.: US 9,846,097 B2
(45) Date of Patent: Dec. 19, 2017

(54) PRESSURE SENSOR WITH VARIABLE SENSE GAP

(71) Applicant: FREESCALE SEMICONDUCTOR, INC., Austin, TX (US)

(72) Inventor: Michael Naumann, Chandler, AZ (US)

(73) Assignee: NXP USA, Inc., Austin, TX (US)

( * ) Notice: Subject to any disclaimer, the term of this patent is extended or adjusted under 35 U.S.C. 154(b) by 101 days.

(21) Appl. No.: 14/931,557

(22) Filed: Nov. 3, 2015

(65) Prior Publication Data
US 2017/0122825 A1 May 4, 2017

(51) Int. Cl.
G01L 9/12 (2006.01)
G01L 9/00 (2006.01)

(52) U.S. Cl.
CPC .............. G01L 9/0072 (2013.01); G01L 9/12 (2013.01)

(58) Field of Classification Search
None
See application file for complete search history.

(56) References Cited

U.S. PATENT DOCUMENTS

| 8,334,159 | B1 | 12/2012 | Fu | |
| 9,383,282 | B2* | 7/2016 | Besling | G01L 9/0042 |
| 2002/0033048 | A1 | 3/2002 | McIntosh et al. | |
| 2009/0036754 | A1* | 2/2009 | Pons | A61B 5/02156 |
| | | | | 600/301 |
| 2009/0152655 | A1* | 6/2009 | Laming | B81C 1/00246 |
| | | | | 257/416 |
| 2012/0024075 | A1* | 2/2012 | Peng | G01L 9/0073 |
| | | | | 73/724 |
| 2014/0151822 | A1* | 6/2014 | Graham | G01L 9/0047 |
| | | | | 257/415 |
| 2014/0159122 | A1* | 6/2014 | Sato | H01L 27/0617 |
| | | | | 257/254 |
| 2014/0319585 | A1* | 10/2014 | Sato | G01L 9/0073 |
| | | | | 257/254 |
| 2015/0102437 | A1 | 4/2015 | Liu et al. | |
| 2015/0311664 | A1 | 10/2015 | Bulovic et al. | |
| 2016/0076959 | A1* | 3/2016 | Chen | G01L 9/0042 |
| | | | | 73/723 |

FOREIGN PATENT DOCUMENTS

EP 2703799 A1 3/2014

* cited by examiner

*Primary Examiner* — Andre Allen
(74) *Attorney, Agent, or Firm* — Charlene R. Jacobsen

(57) ABSTRACT

A sensor device includes a substrate having a port extending through it and a membrane including a first electrode spanning across the port. The port exposes the membrane to a pressure stimulus from an external environment. A second electrode is spaced apart from the first electrode by a gap having a first width. A control circuit applies an actuation voltage to move the second electrode closer to the first electrode and change the gap to a second width that is less than the first width. When the gap is set to the second width, the pressure sensor exhibits a greater sensitivity then when the gap is set to the first width. The membrane with the first electrode is movable in response to the pressure stimulus and the pressure stimulus is sensed as movement of the first electrode relative to the second electrode while the actuation voltage is applied.

17 Claims, 6 Drawing Sheets

US 9,846,097 B2

PRESSURE SENSOR WITH VARIABLE SENSE GAP

TECHNICAL FIELD OF THE INVENTION

The present invention relates generally to microelectromechanical systems (MEMS) sensor packages. More specifically, the present invention relates to a MEMS pressure sensor with a variable sense gap for changing the sensitivity of the pressure sensor.

BACKGROUND OF THE INVENTION

Microelectromechanical systems (MEMS) devices with embedded mechanical components include, for example, pressure sensors, accelerometers, gyroscopes, microphones, digital mirror displays, micro fluidic devices, and so forth. MEMS devices are used in a variety of products such as automobile airbag systems, control applications in automobiles, navigation, display systems, inkjet cartridges, and so forth. Capacitive-sensing MEMS device designs are highly desirable for operation in miniaturized devices due to their low temperature sensitivity, small size, and suitability for low cost mass production. A MEMS pressure sensor typically uses a pressure cavity and a membrane element, referred to as a diaphragm, that deflects under pressure. In some configurations, a change in the distance between two electrodes, where one of the electrodes is stationary and the other electrode is the movable diaphragm, creates a variable capacitor to detect deflection due to the applied pressure over an area.

As the uses for MEMS sensor devices continue to grow and diversify, increasing emphasis is being placed on the development of advanced silicon MEMS sensor devices capable of sensing different physical stimuli at enhanced sensitivities and for integrating these sensors (e.g., accelerometers, gyroscopes, pressure sensors, and the like) into the same miniaturized package. These efforts are primarily driven by existing and potential high-volume applications in automotive, medical, commercial, and consumer products. The integration of MEMS pressure sensors with other types of sensors (such as, accelerometers and gyroscopes) has posed particular challenges in terms of achieving the required enhanced sensitivities for such pressure sensors.

BRIEF DESCRIPTION OF THE DRAWINGS

The accompanying figures in which like reference numerals refer to identical or functionally similar elements throughout the separate views, the figures are not necessarily drawn to scale, and which together with the detailed description below are incorporated in and form part of the specification, serve to further illustrate various embodiments and to explain various principles and advantages all in accordance with the present invention.

DETAILED DESCRIPTION

Embodiments of the present invention entail a pressure sensor device with a variable sense gap and methodology for operating the pressure sensor device. More particularly, a variable sense gap between two electrodes (where one of the two electrodes is part of a diaphragm) is accomplished by making the other electrode movable between at least two positions. In such a manner, the width of the sense gap can be reduced and thereby effectively increase the sensitivity of the pressure sensor device to a pressure stimulus. The structure of the pressure sensor device can more readily enable the integration of high sensitivity pressure sensors into an integrated miniaturized sensor package for improved efficiency, cost savings, and the like.

The instant disclosure is provided to further explain in an enabling fashion the best modes, at the time of the application, of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

Figure 1:
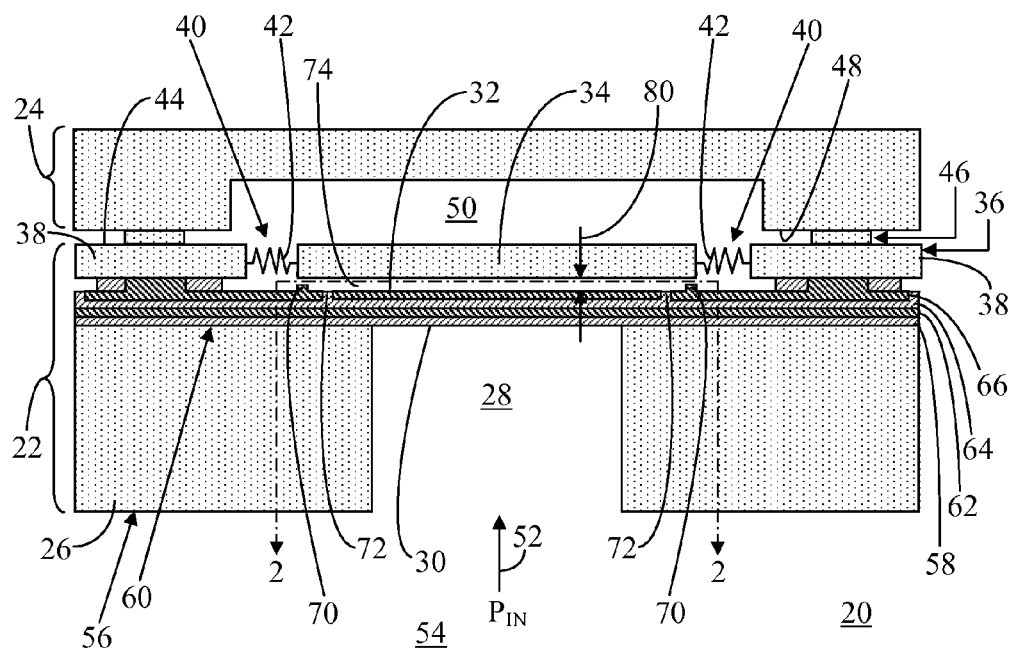
FIG. 1 shows in a simplified and representative form a side view of a microelectromechanical systems (MEMS) pressure sensor in accordance with an embodiment.
Figure 2:
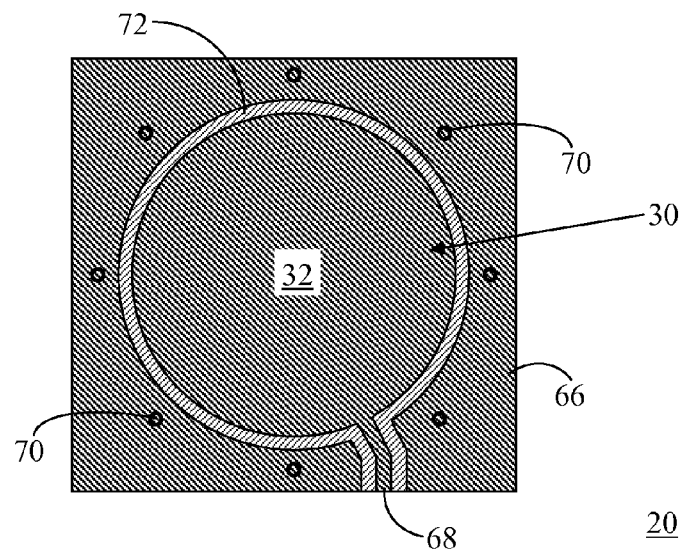
FIG. 2 shows a top view of the pressure sensor along section lines 2-2 in FIG. 1.

Referring to FIGS. 1 and 2, FIG. 1 shows in a simplified and representative form a side view of a microelectromechanical systems (MEMS) sensor device 20 in accordance with an embodiment and FIG. 2 shows a top view of the sensor device 20 along section lines 2-2 in FIG. 1. In the illustrated embodiment, sensor device 20 is a pressure sensor. As such, sensor device 20 will be referred to herein as pressure sensor 20. Although a single pressure sensor 20 is shown in the structure of FIG. 1, it should be understood that pressure sensor 20 may be integrated with an accelerometer, gyroscope, magnetometer, and the like in a multiple stimulus sensor package.

FIGS. 1 and 2 and subsequent FIGS. 3, and 6-8 are illustrated using various shading and/or hatching to distinguish the different elements of the MEMS sensor device, as will be discussed below. These different elements within the structural layers may be produced utilizing current and upcoming micromachining techniques of depositing, patterning, etching, and so forth. Further, it should be understood that the use of relational terms, if any, such as first and second, top and bottom, and the like are used herein solely to distinguish one from another entity or action without necessarily requiring or implying any actual such relationship or order between such entities or actions.

Pressure sensor 20 includes a device structure 22 and a cap structure 24 coupled with device structure 22. In an embodiment, device structure 22 includes a substrate 26 having a port 28 extending through substrate 26. A pressure sensing diaphragm, referred to herein as a membrane 30, having a first electrode 32 spans across port 28. A second electrode 34 is positioned in spaced apart relationship from first electrode 32 such that port 28 underlies second electrode 34.

In an embodiment, device structure 22 includes a structural layer 36 coupled to substrate 26. Structural layer 36 includes a frame member 38 and second electrode 34. Frame member 38 has a central opening 40 in which second electrode 34 is positioned. Second electrode 34 is compliantly coupled to frame member 38 via spring elements 42 which enable movement of second electrode 34 relative to first electrode 32 in a direction that is perpendicular to the surfaces of first and second electrodes 32, 34.

Cap structure 24 is coupled to a top surface 44 of device structure 22 using a bonding layer 46. In some embodiments, bonding layer 46 may be electrically conductive so as to form a conductive interconnection between device structure 22 and cap structure 24. For example, bonding layer 46 may be an Aluminum-Germanium (Al—Ge) bonding layer, a Gold-Tin (Au—Sn) bonding layer, a Copper-Copper (Cu—Cu) bonding layer, a Copper-Tin (Cu—Sn) bonding layer, an Aluminum-Silicon (Al—Si) bonding layer, and so forth. Alternatively, bonding layer 46 may be electrically nonconductive so as to electrically isolate cap structure 24 from device structure.

Bonding layer 46 may be suitably thick so that an inner surface 48 of cap structure 24 is displaced away from and does not contact second electrode 34 in structural layer 36. Thus, a hermetically sealed cavity 50 is produced in which first and second electrodes 32, 34 reside. Cap structure 24 may be a silicon wafer material. Alternatively, cap structure 24 may be an application specific integrated circuit (ASIC) containing electronics associated with pressure sensor 20. As shown, cap structure 24 may further include a cavity region extending inwardly from inner surface 48 of cap structure 24 to enlarge (i.e., deepen) cavity 50. Additionally, cap structure 24 can include one or more electrically conductive through-silicon vias extending through cap structure 24, bond pads formed on an outer surface of cap structure 24, and the like for enabling external electrical connection from pressure sensor 20 to another device. These features are not shown herein for simplicity of illustration.

Pressure sensor 20 is configured to sense an input pressure stimulus ($P_{IN}$), represented by an arrow 52, from an environment 54 external to pressure sensor 20. As such, port 28 extends from a first surface 56 of substrate 26 and entirely through substrate 26 to expose membrane 30 to external environment 54. Membrane 30 may include multiple electrically conductive and dielectric material layers. In one example, a dielectric material (e.g., an oxide and/or a nitride), referred to herein as an isolation layer 58 may be formed on a second surface 60 of substrate 26. An electrically conductive polysilicon layer 62 may be formed on isolation layer 58. Another isolation layer 64 may be formed on polysilicon layer 62, and yet another polysilicon layer 66 may be formed on isolation layer 64.

Polysilicon layer 66 may thereafter be patterned and etched to form first electrode 32 and to electrically isolate first electrode 32 from the surrounding polysilicon layer 66. Polysilicon layer 66 may additionally be patterned and etched to form one or more conductive traces 68 (one shown in FIG. 2) and the like for suitably carrying signals to and from first electrode 32. Accordingly, the entire thickness and various material layers 58, 62, 64, 66 spanning port 28 yield membrane 30, with the topmost polysilicon layer 66 facing second electrode 34 functioning as first electrode 32.

The multiple conductive and isolation material layers 58, 62, 64, 66 are suitably thin so that membrane 30 is movable in response to pressure stimulus ($P_{IN}$) 52 from external environment 54. That is, membrane 30 is exposed to external environment 54 via port 28. Consequently, membrane 30 together with first electrode 32 is capable of movement in a direction that is generally perpendicular to a plane of device structure 22 in response to pressure stimulus 52 from external environment 54. Although one example is shown, other embodiments may have fewer than or more than the particular material layers 58, 62, 64, 66 described above. Furthermore, it should be emphasized that material layers 58, 62, 64, 66 making up membrane 30 having first electrode 32 are not drawn to scale. In a physical configuration, membrane 30 may be significantly thinner than, for example, second electrode 34 so that membrane 30 is able to effectively deflect relative to second electrode 34 in response to pressure stimulus 52.

Pressure sensor 20 further includes spacers 70 extending from second surface 60 of substrate 26 and underlying second electrode 34. In a particular embodiment, spacers 70 are formed in polysilicon layer 66 and extend above first electrode 32 and a remainder of polysilicon layer 66. Spacers 70 are arranged generally uniformly around first electrode 32 and are electrically isolated from first electrode 32. By way of example, a dielectric isolation material 72 surrounds first electrode 32 and conductive traces 68 in order to achieve electrical isolation between first electrode 32 and spacers 70 formed in the surrounding polysilicon layer 66. As will be described in greater detail below, second electrode 34 can be moved closer to or farther away from first electrode 32 in order to change a width of a sense gap 74 between first and second electrodes 32, 34. In a preferred embodiment, second electrode 34 will abut spacers 70 when second electrode 34 is actuated to move closer to first electrode 32.

Pressure sensor 20 uses second electrode 34 as a reference element for first electrode 32 and the pressure within cavity 50 to create a variable capacitor to detect deflection of membrane 30 due to applied pressure, i.e., pressure stimulus 52. As such, pressure sensor 20 senses pressure stimulus 52 from environment 54 as movement of first electrode 32 relative to second electrode 34. This change in position results in an output signal, i.e., a capacitance, that is indicative of the magnitude of pressure stimulus 52. Accordingly, pressure sensor 20 is adapted to sense pressure stimulus 52 as movement of membrane 30 together with first electrode 32 relative to second electrode 34.

Port 28 is visible in the side view illustration of FIG. 1. However, port 28 is obscured from view in FIG. 2 by membrane 30 having first electrode 32. Instead FIG. 2 is provided to illustrate a representative shape of diaphragm 30 and first electrode 32; to illustrate electrically conductive trace 68 extending to first electrode 32; to illustrate the electrical isolation of first electrode 32 from the surrounding material structure via isolation material 72; and to illustrate an exemplary arrangement of spacers 70. The locations, quantities, shapes, and relative sizes of the various elements are representative only. Those skilled in the art will appreciate that there may be other locations, quantities, shapes, and relative sizes of these elements in accordance with a particular design configuration.

Figure 3:
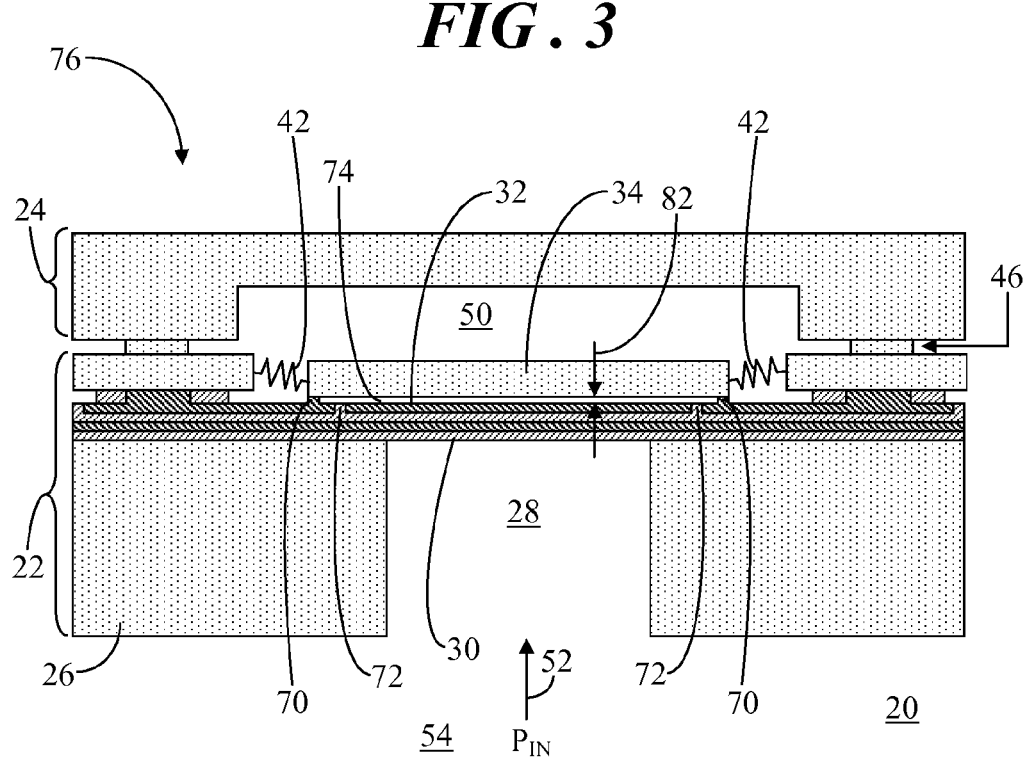
FIG. 3 shows the pressure sensor of FIG. 1 in a sense mode.

Referring now to FIGS. 1 and 3, FIG. 3 shows pressure sensor 20 in a sense mode 76 in which second electrode 34 is actuated to abut spacers 70. Conversely, FIG. 1 shows pressure sensor 20 in a non-sensing mode in which second electrode 34 does not abut spacers 70. The sensitivity of pressure sensor 20 to pressure stimulus 52 is due at least in part to the width of sense gap 74. That is, pressure sensor 20 will become less sensitive as the width of sense gap 74 increases and conversely, pressure sensor 20 will become more sensitive as the width of sense gap 74 decreases.

In an embodiment, second electrode 34 is actuated via a control/sense circuit 78 (see FIG. 4) to move second electrode 34 relative to first electrode 32 until second electrode 34 abuts spacers 70. The movement of second electrode 34 changes the width of sense gap 74 from a first width 80 as depicted in FIG. 1 to a second width 82 as depicted in FIG. 2. When sense gap 74 between first and second electrodes 32, 34 is first width 80, pressure sensor 20 exhibits a first sensitivity to pressure stimulus 52, and when sense gap 74 between first and second electrodes 32, 34 is second width 82, pressure sensor 20 exhibits a second sensitivity to pressure stimulus 52. It should be readily observed that following movement of second electrode 34, second width 82 is less than first width 80. Since second width 82 is less than first width 80, the second sensitivity of pressure sensor 20 to pressure stimulus 52 will be greater than the first sensitivity. Accordingly, movement of second electrode 34 toward first electrode 32 effectively increases the sensitivity of pressure sensor 20 to pressure stimulus 52.

A variable width of sense gap 74 may be useful in a number of situations. For example, a manufacturing process may result in the width of sense gap 74 being too great to achieve a desired sensitivity. As such, sense gap 74 can be narrowed following manufacturing to thereby achieve a desired sensitivity. In another example, the sensitivity of pressure sensor 20 may be varied between a lower sensitivity and a higher sensitivity in accordance with its particular end-use application.

Figure 4:
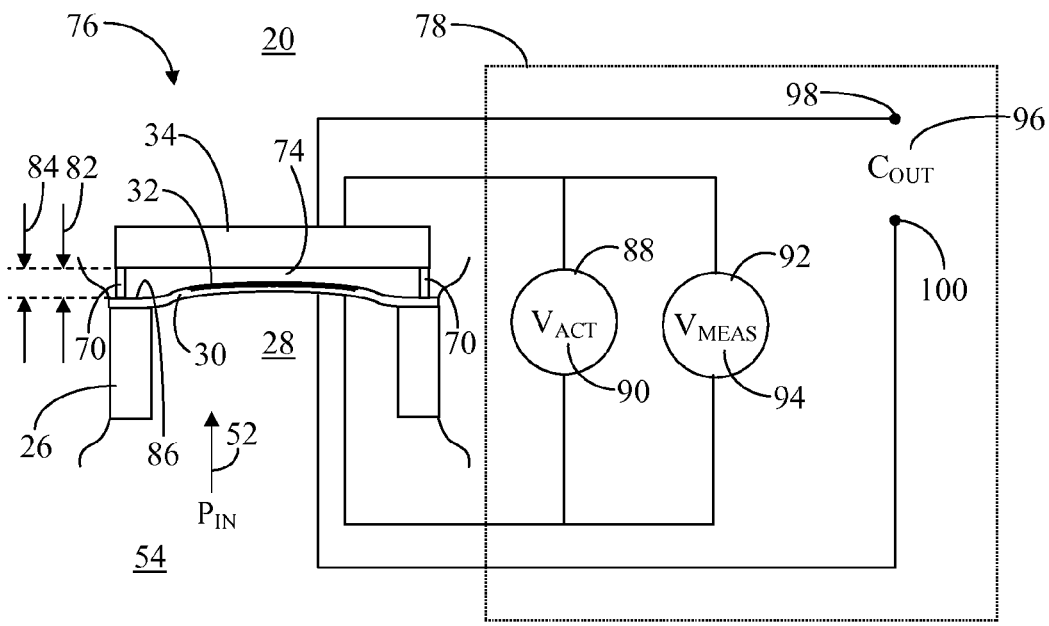
FIG. 4 shows a highly simplified block diagram of electrodes and a control circuit of the MEMS pressure sensor of FIG. 1.

FIG. 4 shows a highly simplified block diagram of first and second electrodes 32, 34 and control/sense circuit 78 of pressure sensor 20. In particular, FIG. 4 is provided to demonstrate actuation of second electrode 34 in order to change sense gap 74 from first width 80 (FIG. 1) to second width 82, thereby effectively increasing the sensitivity of pressure sensor 20. Thus, pressure sensor 20 is presented in sense mode 76 in which second electrode 34 abuts spacers 70. As such, a height 84 of spacers 70 above a sensing surface 86 of first electrode 32 (when membrane 30 is not being deflected) defines, establishes, or otherwise limits second width 82 of sense gap 74. Further, pressure sensor 20 is presented to illustrate deflection of membrane 30 with first electrode 32 toward second electrode 34 in response to a magnitude of pressure stimulus 52 when pressure sensor 20 is in sense mode 76.

In an embodiment, control/sense circuit 78 includes an actuation voltage source 88 in electrical communication with each of first and second electrodes 32, 34 for applying an actuation voltage 90, labeled $V_{ACT}$, between first and second electrodes 32, 34. Actuation voltage 90 may be a direct current (DC) bias voltage that is sufficiently high to pull second electrode 34 into static contact with spacers 70 on substrate 26. That is, actuation voltage 90 generates electrostatic force to pull second electrode 34 into contact with spacers 70 and thereby reduce sense gap 74 to second width 82. The electrostatic force is sufficiently large to ensure the contact of second electrode 34 to spacers 70 while pressure sensor 20 is in sense mode 76.

Control/sense circuit 78 further includes a measurement voltage source 92 in electrical communication with each of first and second electrodes 32, 34 for applying a measurement voltage 94, labeled $V_{MEAS}$, between first and second electrodes 32, 34. A sensor based on a capacitive principle of operation requires a capacitance between a pair of electrodes that is modulated, i.e., changed, by the physical quantity to be measured. In this case, pressure sensor 20 is adapted to measure the magnitude of pressure stimulus 52, and the capacitance between first and second electrodes 32, 34 changes in response to the magnitude of pressure stimulus 52. Measurement voltage 94 may be an alternating current (AC) voltage or a switched DC voltage (like a square wave). The changing measurement voltage 94 over the capacitance between first and second electrodes 32, 34 charges or un-charges the capacitance. The amount of flowing charge is a measure for the capacitance between first and second electrodes 32, 34 for a given voltage or voltage change. Accordingly, measurement voltage 94 (either an AC voltage or switched DC voltage) may be used for capacitance measurement in order to obtain an output signal 96, labeled $C_{OUT}$, indicative of the magnitude of pressure stimulus 52 causing deflection of membrane 30.

FIG. 4 is illustrated with actuation voltage source 88 being a separate element from measurement voltage source 92 for illustrative purposes. Furthermore, FIG. 4 is illustrated with a first set of signal lines between voltage sources 88, 92 and first and second electrodes 32, 34 and a second set of signal lines between first and second electrodes 32, 34 and capacitance output nodes 98, 100 for illustrative purposes. It should be understood, however, that a single voltage source may apply both actuation voltage 90 and measurement voltage 94 as a single combined signal that is large enough and fulfills certain characteristics. By way of example, the combined signal could include a relatively high DC component for pulling second electrode 34 into contact with spacers 70. The combined signal could additionally include a relatively small AC or switched DC component to be used for capacitance measurement to produce output signal 96. Alternatively, a relatively high AC signal (square or sine) with a very high frequency (e.g., higher than the eigenfrequency (i.e., the frequency at which the system may vibrate) of the pull-down mode may be implemented.

In some embodiments, when cap structure 24 is an application specific integrated circuit, control/sense circuit 78 may be provided within cap structure 24. In other embodiments, control/sense circuit 78 may be a separate device that is electrically coupled with pressure sensor 20 via bond wires or other electrical interconnections as known to those skilled in the art. Further, control/sense circuit 78 may include circuitry for amplifying and/or conditioning output signal 96, capacitance-to-voltage converter circuitry for converting output signal 96 to an analog voltage signal, analog-to-digital converter circuitry for converting the analog voltage signal to a digital output signal, and the like. This additional circuitry is not presented herein for simplicity of illustration.

Figure 5:
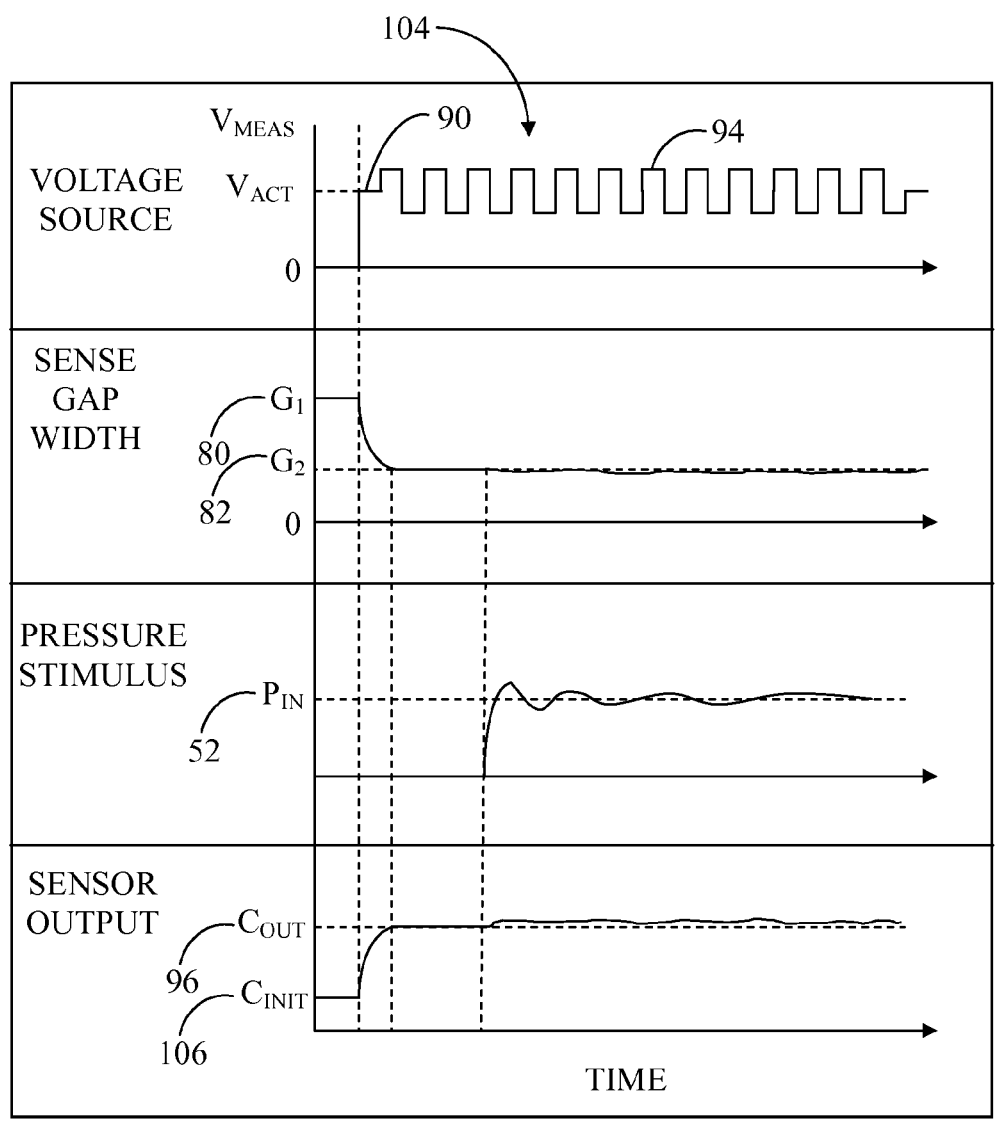
FIG. 5 shows an exemplary timing and signal diagram associated with the pressure sensor of FIG. 1.

FIG. 5 shows an exemplary timing and signal diagram 102 associated with the operation of pressure sensor 20. In an operational mode, pressure sensor 20 is provided in a particular end-user application. Actuation voltage 90 is applied to second electrode 34 (FIG. 4) to move second electrode 34 relative to first electrode 32 (FIG. 4) such that the movement of second electrode 34 changes sense gap 74 (FIG. 4) from first width 80 to the smaller second width 82. While actuation voltage 90 is applied, a magnitude of input pressure stimulus 52 ($P_N$) is sensed as movement of membrane 30 with first electrode 32 relative to second electrode 34 (FIG. 4).

In diagram 102, a combined signal 104 is applied between first and second electrodes 32, 34. Combined signal 104 includes a relatively high DC component (e.g., actuation voltage 90, $V_{ACT}$) for pulling second electrode 34 into contact with spacers 70 (FIG. 4). Following some lag in time, second electrode 34 is pulled into contact with spacers 70 to produce sense gap 74 having second width 82. In this example, combined signal 104 additionally includes a relatively small switched DC component (measurement voltage 94, $V_{MEAS}$) that is used for capacitance measurement in order to produce capacitance output signal 96 ($C_{OUT}$) where output signal 96 is responsive to pressure stimulus 52 and varies from an initial capacitance 106 ($C_{INIT}$) before gap 74 is reduced to second width 82. Again, while combined signal 104 (which includes the actuation signal component and the switched DC component) is being applied to second electrode 34, output signal 96 ($C_{OUT}$) is detected. Thereafter, output signal 96 is suitably processed and converted to a value that is representative of a magnitude of pressure stimulus 52.

Figure 6:
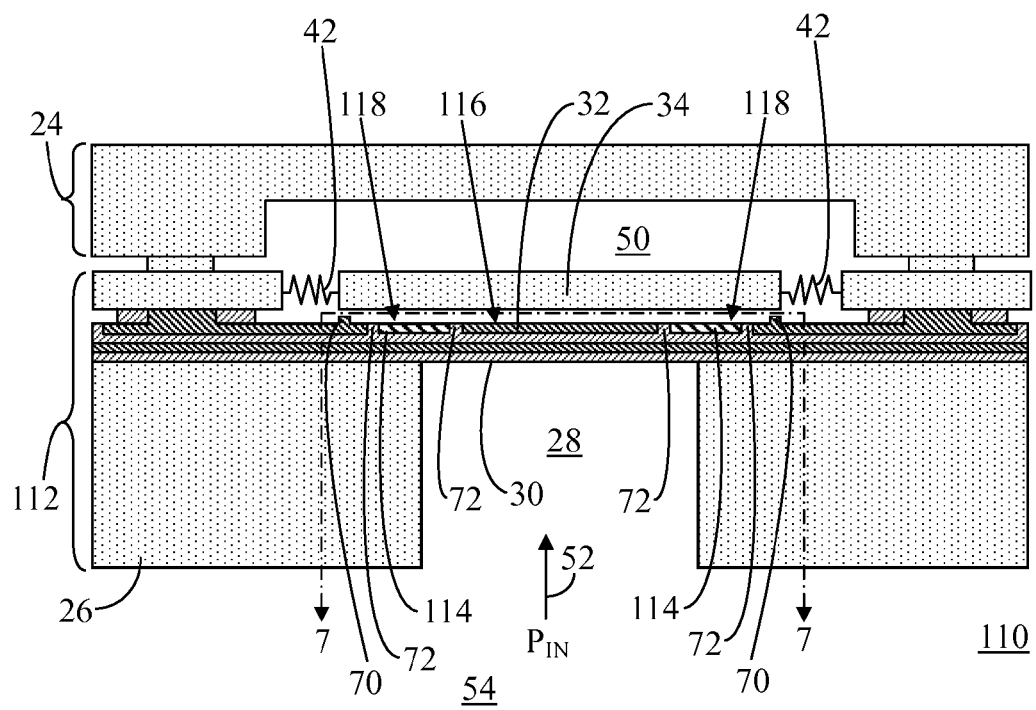
FIG. 6 shows a side view of a MEMS pressure sensor in accordance with another embodiment.
Figure 7:
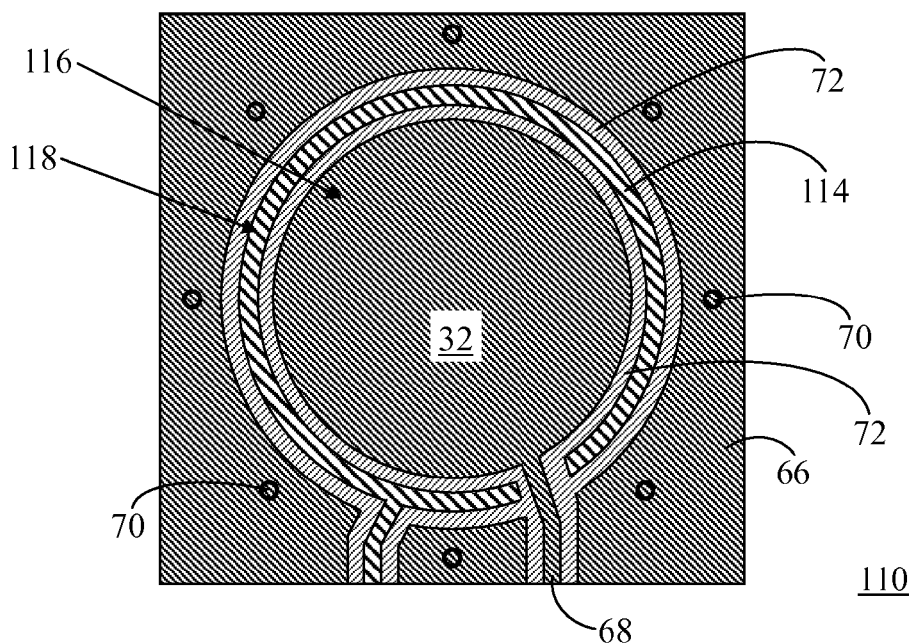
FIG. 7 shows a top view of the pressure sensor along section lines 7-7 in FIG. 6.

Referring now to FIGS. 6 and 7, FIG. 6 shows a side view of a MEMS pressure sensor 110 in accordance with another embodiment, and FIG. 7 shows a top view of pressure sensor 110 along section lines 7-7 in FIG. 6. Pressure sensor 110 is similar to pressure sensor 20. Therefore, similar features will share the same reference numbers. Accordingly, pressure sensor 110 includes a device structure 112 and cap structure 24 coupled with device structure 112. Device structure 112 includes substrate 26 having port 28 extending through substrate 26. Membrane 30 having first electrode 32 spans across port 28. Additionally, second electrode 34 is positioned in spaced apart relationship from first electrode 32 such that port 28 underlies second electrode 34.

In accordance with the embodiment of FIGS. 6 and 7, device structure 112 further includes a third electrode 114 formed in polysilicon layer 66 and laterally displaced away from first electrode 32. Third electrode 114 is represented by rightwardly and downwardly directed wide hatching in order to better distinguish third electrode 114 from first electrode 32 and the remainder of polysilicon layer 66. It should be understood, however, that polysilicon layer 66 can be suitably patterned and etched to additionally form third electrode 114 in polysilicon layer 66. Isolation material 72 electrically isolates third electrode 114 from first electrode 32 and electrically isolates third electrode 114 from the surrounding polysilicon layer 66 containing spacers 70.

In the illustrated embodiment, third electrode 114 is generally ring shaped so as to surround first electrode 32. In some embodiments, third electrode 114 may reside at least partially on membrane 30 as well as at portions of device structure 112 that are supported by substrate 26. In particular, first electrode 32 is located at a central region 116 of membrane 30 where the largest deflections occur in response to pressure stimulus 52 and third electrode 114 is located at an outer region 118 of membrane 30 and/or on substrate 26 at which little or no deflection occurs in response to pressure stimulus 52.

As will be discussed in connection with FIG. 9, in the configuration of first, second, and third electrodes 32, 34, 114, actuation voltage 90 (see FIG. 9) is applied between second and third electrodes 34, 114 to pull second electrode 34 into contact with spacers 70. Third electrode 114, as related to second electrode 34, may also be used to determine a "fixed" reference capacitance ($C_{REF}$) within pressure sensor 110. First and second electrodes 32, 34 are used for measurement of capacitance changes due to deformation of membrane 30 by pressure stimulus 52.

Figure 8:
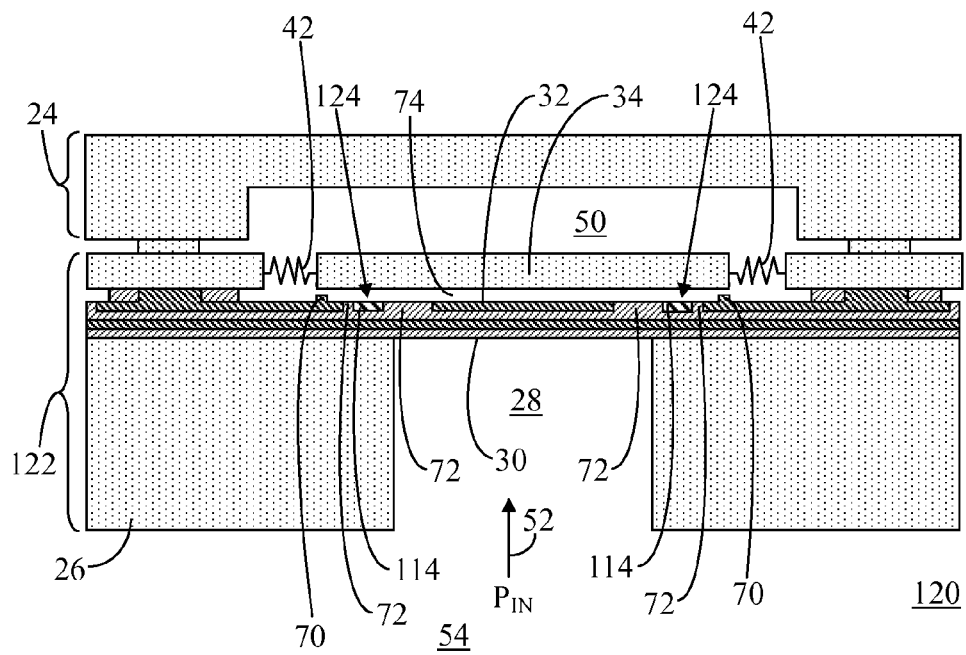
FIG. 8 shows a side view of a MEMS pressure sensor in accordance with another embodiment.

FIG. 8 shows a side view of a MEMS pressure sensor 120 in accordance with another embodiment. Pressure sensor 120 is also similar to pressure sensor 20. Therefore, similar features will share the same reference numbers. Accordingly, pressure sensor 120 includes a device structure 122 and cap structure 24 coupled with device structure 122. Device structure 122 includes substrate 26 having port 28 extending through substrate 26. Membrane 30 having first electrode 32 spans across port 28. Additionally, second electrode 34 is positioned in spaced apart relationship from first electrode 32 such that port 28 underlies second electrode 34.

Like pressure sensor 110 (FIG. 6), device structure 122 further includes third electrode 114 formed in polysilicon layer 66 and laterally displaced away from first electrode 32. Third electrode 114 is again represented by rightwardly and downwardly directed wide hatching in order to better distinguish third electrode 114 from first electrode 32 and the remainder of polysilicon layer 66. It should be understood, however, that polysilicon layer 66 can be suitably patterned and etched to additionally form third electrode 114 in polysilicon layer 66. Isolation material 72 electrically isolates third electrode 114 from first electrode 32 and electrically isolates third electrode 114 from the surrounding polysilicon layer 66 containing spacers 70. Unlike the configuration of pressure sensor 110 (FIG. 6), third electrode 114 of pressure sensor 120 resides entirely on a portion of device structure that is supported by substrate 26. That is, third electrode 124 is located at a non-membrane area 124 of substrate 26.

As discussed previously, the sensitivity of a capacitive pressure sensor depends on the width of the sense gap (e.g., sense gap 74), as well as other device parameters that are not discussed herein. Trimming, i.e., calibration, may be performed before the pressure sensors are shipped in order to adjust the device sensitivity to a target value, accounting for process related variations of the width of sense gap.

Per convention, the width of the sense gap is defined by the process and fixed, i.e., static, following production. In accordance with the embodiments described above, second width 82 (FIG. 4) of sense gap 74 for each of pressure sensors 20 (FIG. 1), 110 (FIG. 7), and 120 (FIG. 9) is given by height 84 (FIG. 4) of spacers 70 when second electrode 34 is pulled toward substrate 26 and contacts spacers 70. Consequently, second width 82 of sense gap 74 is re-established for every contact event, i.e., every time the pressure sensor is powered up such that second electrode 34 is actuated and pulled into contact with spacers 70. Due to the roughness and topology of contact surfaces between second electrode 34 and spacers 70, small variations of second width 82 of sense gap 74 may occur between contact events, thereby affecting device sensitivity.

When variations of second width 82 of sense gap 74 between different contact events are small the electrode arrangements of either of pressure sensors 20 or 110 may be applied. That is, small variations of second width 82 of sense gap 74 may be tolerated and are therefore considered within the given measurement accuracy of the device. However, in situations in which variations of second width 82 of sense gap 74 between contact events cannot be tolerated (for example, in a high accuracy device), the electrode configuration of pressure sensor 120 may be applied.

Again, as will be discussed in connection with FIG. 9, in the configuration of first, second, and third electrodes 32, 34, 114, actuation voltage 90 (see FIG. 9) can be applied between second and third electrodes 34, 114 to pull second electrode 34 into contact with spacers 70. First and second electrodes 32, 34 can be used for measurement of capacitance changes due to deformation of membrane 30 by pressure stimulus 52. However, since third electrode 114 of pressure sensor 120 is now fully supported by substrate 26, the capacitance between second and third electrodes 34, 114 is independent from any deformation of membrane 30 due to pressure stimulus 52. As such, third electrode 114 can be used for measurement of a "fixed" reference capacitance ($C_{REF}$) between second and third electrodes 34, 114.

Figure 9:
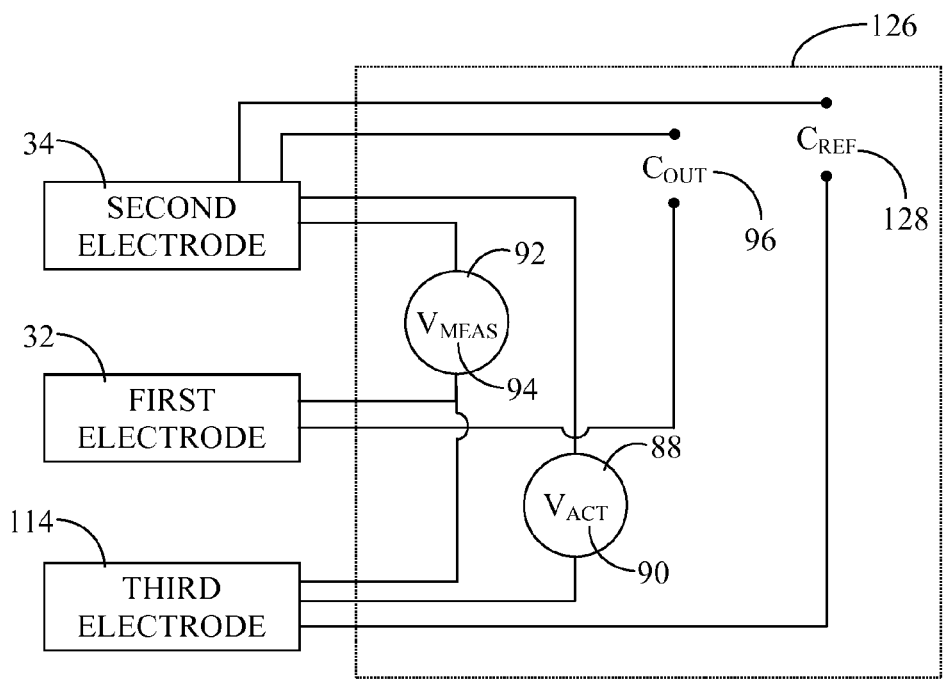
FIG. 9 shows a highly simplified block diagram of electrodes and a control circuit of the pressure sensors of FIGS. 6 and 7.

FIG. 9 shows a highly simplified block diagram of electrodes 32, 34, 114 and a control/sense circuit 126 associated with either of pressure sensor 110 (FIG. 6) or pressure sensor 120 (FIG. 8). Control/sense circuit 126 includes actuation voltage source 88 in electrical communication with each of second and third electrodes 34, 114 for applying actuation voltage 90, labeled $V_{ACT}$, between second and third electrodes 34, 114. Again, actuation voltage 90 may be a DC bias voltage that is sufficiently high to pull second electrode 34 into static contact with spacers 70 on substrate 26.

Control/sense circuit 126 further includes measurement voltage source 92 in electrical communication with each of first and second electrodes 32, 34 for applying measurement voltage 94, labeled $V_{MEAS}$, between first and second electrodes 32, 34 in order to obtain an output signal 96, labeled $C_{OUT}$, indicative of the magnitude of pressure stimulus 52 causing deflection of membrane 30. Additionally, measurement voltage source 92 is in electrical communication with each of second and third electrodes 34, 114 for applying measurement voltage 94 between second and third electrodes 34, 114 in order to obtain a capacitance reference signal 128, labeled $C_{REF}$, that is independent from any deflection of membrane 30.

As mentioned above in connection with FIG. 4, when cap structure 24 is an ASIC, control/sense circuit 126 may be provided within cap structure 24. In other embodiments, control/sense circuit 126 may be a separate device that is electrically coupled with either of pressure sensors 110 or 120 via bond wires or other electrical interconnections as known to those skilled in the art. Further, control/sense circuit 126 may include circuitry for amplifying and/or conditioning output signal 96, capacitance-to-voltage converter circuitry for converting output signal 96 to an analog voltage signal, analog-to-digital converter circuitry for converting the analog voltage signal to a digital output signal, and the like. This additional circuitry is not presented herein for simplicity of illustration.

In the configuration of pressure sensor 120 (FIG. 8), capacitance reference signal 128 depends only upon the width (e.g., $G_{SENSE}$) of sense gap 74 since third electrode 114 is fully supported by substrate 26. Therefore, capacitance reference signal 128 may be used to trim or calibrate the sensitivity of pressure sensor 120 after each contact event between second electrode 34 (FIG. 8) and spacers 70 (FIG. 8). In one device calibration example, a one-time contact trim may be performed to determine the relationship between the sensitivity, S, of pressure sensor 120 and the measured capacitance reference signal.128. Based upon a mathematical model of pressure sensor 120 (i.e., geometrical dimensions), the functions $G_{SENSE}(C_{REF})$ and $S(G_{SENSE})$ can be established and programmed into control circuit 126 to adjust the sensitivity, S, of pressure sensor 120 based on a measured capacitance reference signal 128.

In another device calibration example, a multi-contact trim process may be performed to build a direct relationship between the measured capacitance reference signal 128 and the sensitivity, S, of pressure sensor 120. Different contact events between second electrode 24 and spacers 70 deliver different data points, $S(G_{SENSE})_i$. Based on multiple data points, i, a mathematical relationship via fit functions may be established between capacitance reference signal 128 and the sensitivity of pressure sensor 120, $S(C_{REF})$ that can be programmed into control circuit 126.

Figure 10:
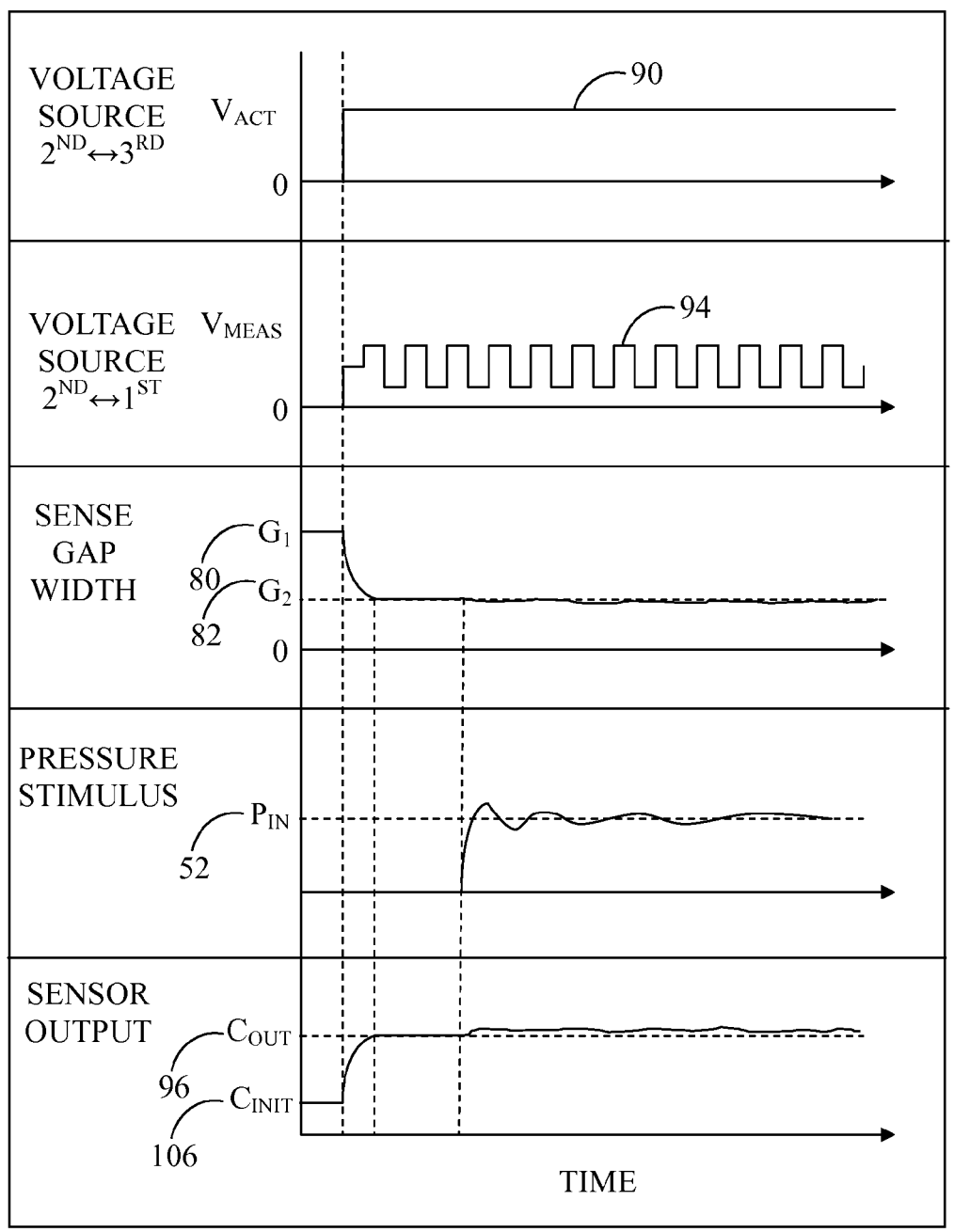
FIG. 10 shows an exemplary timing and signal diagram associated with the pressure sensors of FIGS. 6 and 8.

FIG. 10 shows an exemplary timing and signal diagram 130 associated with the pressure sensors of FIGS. 6 and 8. In an operational mode, actuation voltage 90 is applied between second and third electrodes 34, 114 (FIG. 9) to move second electrode 34 relative to first and third electrodes 32, 114 (FIG. 9). That is, actuation voltage 90 is a relatively high DC component capable of pulling second electrode 34 into contact with spacers 70 (FIG. 4). The movement of second electrode 34 changes sense gap 74 (FIG. 4) from first width 80 to the smaller second width 82.

While actuation voltage 90 is applied, a magnitude of input pressure stimulus 52 ($P_{IN}$) can be sensed as movement of membrane 30 with first electrode 32 relative to second electrode 34. For example, measurement voltage 94 is applied between second and third electrodes 34, 114 and is used for capacitance measurement in order to produce reference capacitance signal 128 ($C_{REF}$), as shown in FIG. 9. Additionally, measurement voltage 94 is applied between first and second electrodes 32, 34 and is used for capacitance measurement in order to produce capacitance output signal 96 ($C_{OUT}$) where output signal 96 is responsive to pressure stimulus 52 and varies from an initial capacitance 128 ($C_{INIT}$) before gap 74 is reduced to second width 82. Thereafter, output signal 96 can be suitably processed and converted to a value that is representative of a magnitude of input pressure stimulus 52.

In summary, embodiments of a pressure sensor device with a variable sense gap and methodology for operating the pressure sensor device. An embodiment of a sensor device comprises a substrate having a port extending through the substrate, a membrane spanning across the port, the membrane including a first electrode, a second electrode positioned in spaced apart relationship from the first electrode, wherein the second electrode is spaced apart from the first electrode by a gap having a first width, and a control circuit for applying an actuation voltage to the second electrode to move the second electrode relative to the first electrode, wherein movement of the second electrode changes the gap from the first width to a second width.

An embodiment of pressure sensor device comprises a substrate having a port extending through the substrate, a membrane spanning across the port, the membrane including a first electrode, and the port exposing the membrane to a pressure stimulus from an external environment. A second electrode is positioned in spaced apart relationship from the first electrode, wherein the second electrode is spaced apart from the first electrode by a gap having a first width. The pressure sensor device further comprises a control circuit for applying an actuation voltage to the second electrode to move the second electrode relative to the first electrode and change the gap from the first width to a second width, the second width being less than the first width, wherein when the gap between the first and second electrodes is the first width, the pressure sensor exhibits a first sensitivity to the pressure stimulus and when the gap between the first and second electrodes is the second width, the pressure sensor exhibits a second sensitivity to the pressure stimulus, the second sensitivity being greater than the first sensitivity. The membrane together with the first electrode are movable in response to the pressure stimulus and a magnitude of the pressure stimulus is sensed as movement of the first electrode relative to the second electrode while the actuation voltage is being applied.

An embodiment of a method comprises providing a pressure sensor device, the pressure sensor device including a substrate, a membrane having a first electrode, and a second electrode, wherein a port extends through the substrate, the membrane spans across the port, the second electrode is spaced apart from the first electrode by a gap having a first width, the port exposes the membrane to a pressure stimulus from an external environment, and the membrane together with the first electrode are movable in response to the pressure stimulus. The method further comprises applying an actuation voltage to the second electrode to move the second electrode relative to the first electrode, wherein movement of the second electrode changes the gap from the first width to a second width, and while the actuation voltage is applied to the second electrode, sensing a magnitude of the pressure stimulus as movement of the first electrode relative to the second electrode.

Thus, embodiments described herein include pressure sensor devices each having a variable sense gap and methodology for operating the pressure sensor devices. More particularly, a variable sense gap between two electrodes (where one of the electrodes is part of a diaphragm) is accomplished by making the other electrode that is suspended over the diaphragm movable between at least two positions. In such a manner, the width of the sense gap can be reduced and thereby effectively increase the sensitivity of the pressure sensor device to a pressure stimulus. The structure of the pressure sensor device can more readily enable the integration of high sensitivity pressure sensors into an integrated miniaturized multi-stimulus sensor package for improved efficiency, cost savings, and the like.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A sensor device comprising:
   a substrate having a port extending through said substrate;
   a membrane spanning across said port, said membrane including a first electrode;
   a second electrode positioned in spaced apart relationship from said first electrode, wherein said second electrode is spaced apart from said first electrode by a gap having a first width;
   a third electrode formed on a surface of said substrate and laterally displaced away from said first electrode; and
   a control circuit electrically coupled to each of said second and third electrodes for applying an actuation voltage between said second and third electrodes to move said second electrode relative to said first electrode, wherein movement of said second electrode changes said gap from said first width to a second width.

2. The sensor device of claim 1 wherein following said movement of said second electrode, said second width is less than said first width.

3. The sensor device of claim 1 wherein said sensor device comprises a pressure sensor, said port exposes said membrane to a pressure stimulus from an external environment, said membrane together with said first electrode are movable in response to said pressure stimulus, and said pressure sensor is adapted to sense a magnitude of said pressure stimulus as movement of said first electrode relative to said second electrode.

4. The sensor device of claim 3 wherein:
   when said gap between said first and second electrodes is said first width, said pressure sensor exhibits a first sensitivity to said pressure stimulus; and
   when said gap between said first and second electrodes is said second width, said pressure sensor exhibits a second sensitivity to said pressure stimulus, said second sensitivity differing from said first sensitivity.

5. The sensor device of claim 3 wherein said control circuit is configured to apply said actuation voltage to said second electrode when said pressure sensor is in a sense mode during which said pressure sensor is sensing said pressure stimulus.

6. The sensor device of claim 1 wherein said substrate comprises spacers extending from said substrate, said spacers underlie said second electrode, and said movable second electrode abuts said spacers in response to application of said actuation voltage.

7. The sensor device of claim 6 wherein a height of said spacers above said first electrode first defines said second width of said gap.

8. The sensor device of claim 6 wherein said spacers are electrically isolated from said first electrode.

9. The sensor device of claim 1 further comprising:
   a structural layer coupled to said substrate, said structural layer including a frame member and said second electrode, said frame member having a central opening in which said second electrode is positioned, said second electrode being compliantly coupled to said frame member; and
   a cap structure coupled with said frame member to produce a cavity between said substrate and said cap structure in which said second electrode is located, wherein said membrane spanning across said port isolates said cavity from said external environment.

10. The sensor device of claim 1 wherein said port exposes said membrane to a pressure stimulus from an external environment, said membrane is movable in response to said pressure stimulus, said first electrode is located at a first region of said membrane, and said third electrode is located at a second region of said membrane, said first region deflecting more than said second region in response to said pressure stimulus.

11. The sensor device of claim 1 wherein said third electrode is located at a non-membrane area of said surface of said substrate.

12. The sensor device of claim 1 wherein said port exposes said membrane to a pressure stimulus from an external environment, said membrane is movable in response to said pressure stimulus, and said sensor device further comprises a sense circuit electrically coupled to each of said second and third electrodes for receiving a reference signal that is independent from movement of said membrane.

13. A pressure sensor device comprising:
- a substrate having a port extending through said substrate;
- a membrane spanning across said port, said membrane including a first electrode, and said port exposing said membrane to a pressure stimulus from an external environment;
- a second electrode positioned in spaced apart relationship from said first electrode, wherein said second electrode is spaced apart from said first electrode by a gap having a first width;
- a third electrode formed on a surface of said substrate and laterally displaced away from said first electrode; and
- a control circuit electrically coupled to each of said second and third electrodes for applying an actuation voltage between said second and third electrodes to move said second electrode relative to said first electrode and change said gap from said first width to a second width, said second width being less than said first width, wherein:
  - when said gap between said first and second electrodes is said first width, said pressure sensor exhibits a first sensitivity to said pressure stimulus;
  - when said gap between said first and second electrodes is said second width, said pressure sensor exhibits a second sensitivity to said pressure stimulus, said second sensitivity being greater than said first sensitivity;
  - said membrane together with said first electrode are movable in response to said pressure stimulus; and
  - a magnitude of said pressure stimulus is sensed as movement of said first electrode relative to said second electrode while said actuation voltage is being applied.

14. The pressure sensor device of claim 13 wherein said substrate comprises spacers extending from said substrate, said spacers underlie said second electrode, and said movable second electrode abuts said spacers in response to application of said actuation voltage.

15. The pressure sensor device of claim 13 further comprising:
- a structural layer coupled to said substrate, said structural layer including a frame member and said second electrode, said frame member having a central opening in which said second electrode is positioned, said second electrode being compliantly coupled to said frame member; and
- a cap structure coupled with said frame member to produce a cavity between said substrate and said cap structure in which said second electrode is located, wherein said membrane spanning across said port isolates said cavity from said external environment.

16. A method comprising:
- providing a pressure sensor device, said pressure sensor device including a substrate, a membrane having a first electrode, a second electrode, and a third electrode formed on a surface of said substrate and laterally displaced away from said first electrode, wherein a port extends through said substrate, said membrane spans across said port, said second electrode is spaced apart from said first electrode by a gap having a first width, said port exposes said membrane to a pressure stimulus from an external environment, and said membrane together with said first electrode are movable in response to said pressure stimulus;
- applying an actuation voltage between said second and third electrodes to move said second electrode relative to said first electrode, wherein movement of said second electrode changes said gap from said first width to a second width; and
- while said actuation voltage is applied between said second and third electrodes, sensing a magnitude of said pressure stimulus as movement of said first electrode relative to said second electrode.

17. The method of claim 16 wherein:
- prior to said applying, said pressure sensor exhibits a first sensitivity to said pressure stimulus; and
- during said applying, said second width is less than said first width and said pressure sensor exhibits a second sensitivity to said pressure stimulus that is greater than said first sensitivity.

* * * * *